UNITED STATES PATENT OFFICE.

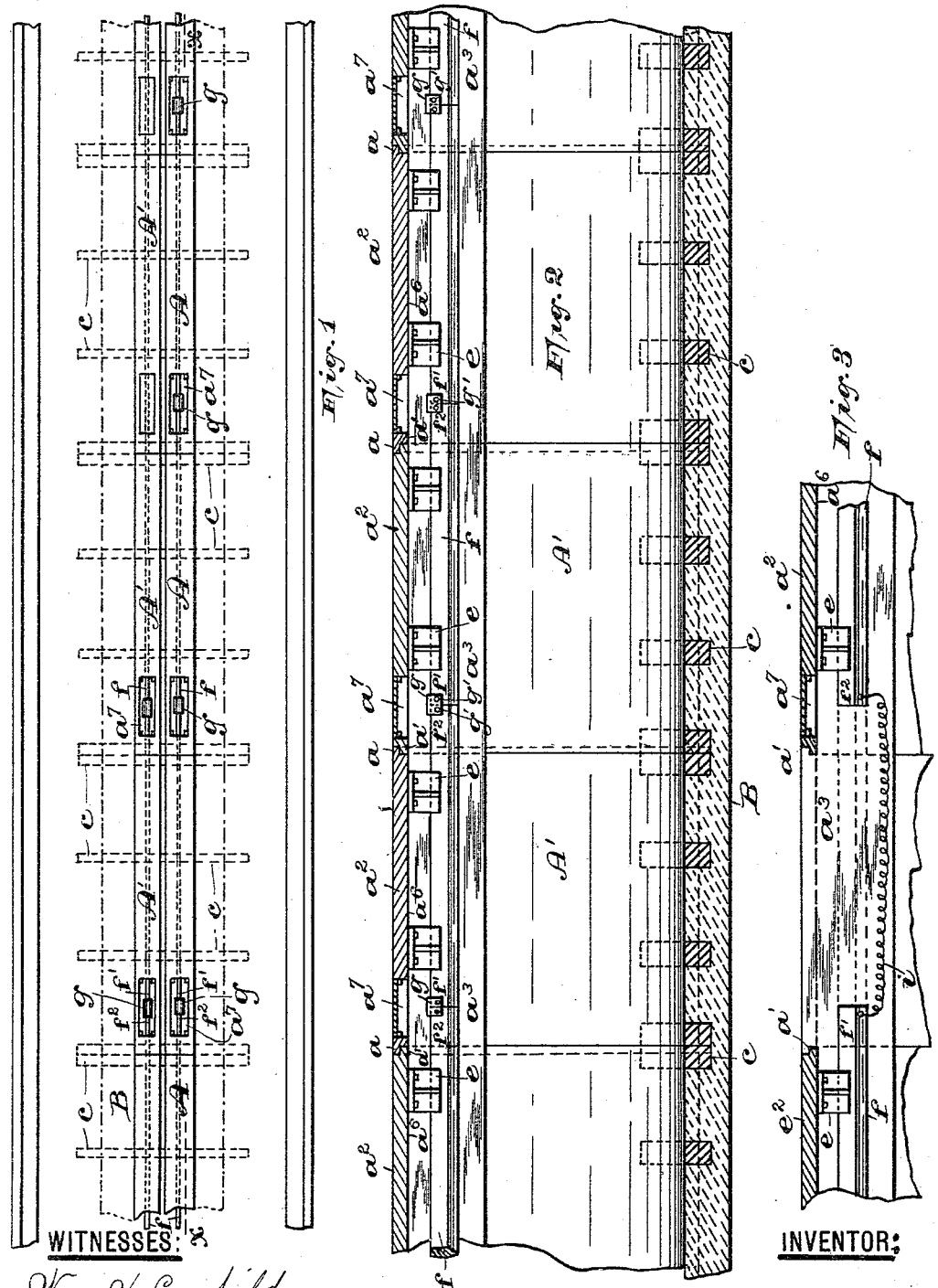

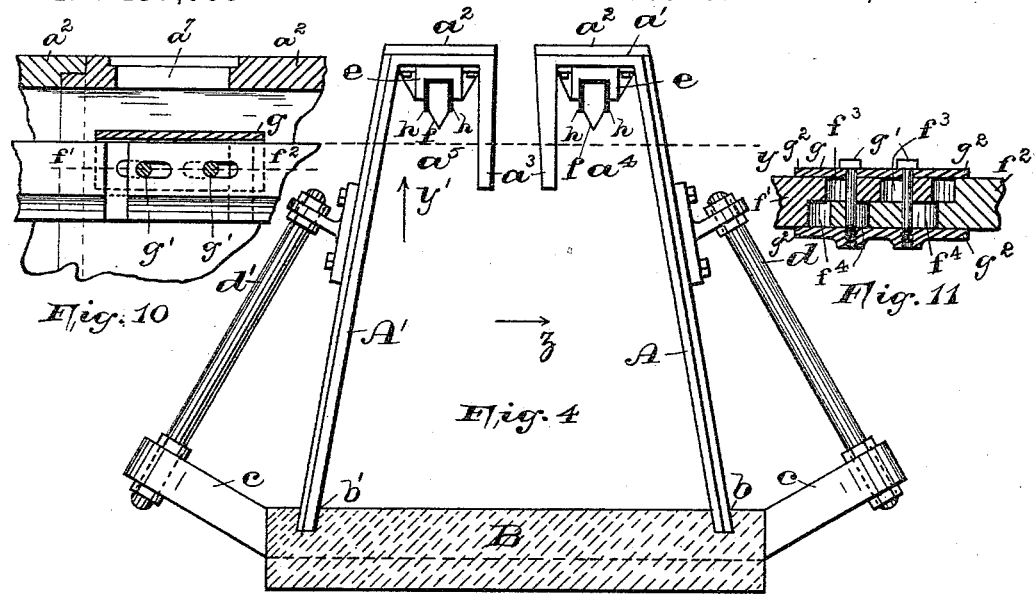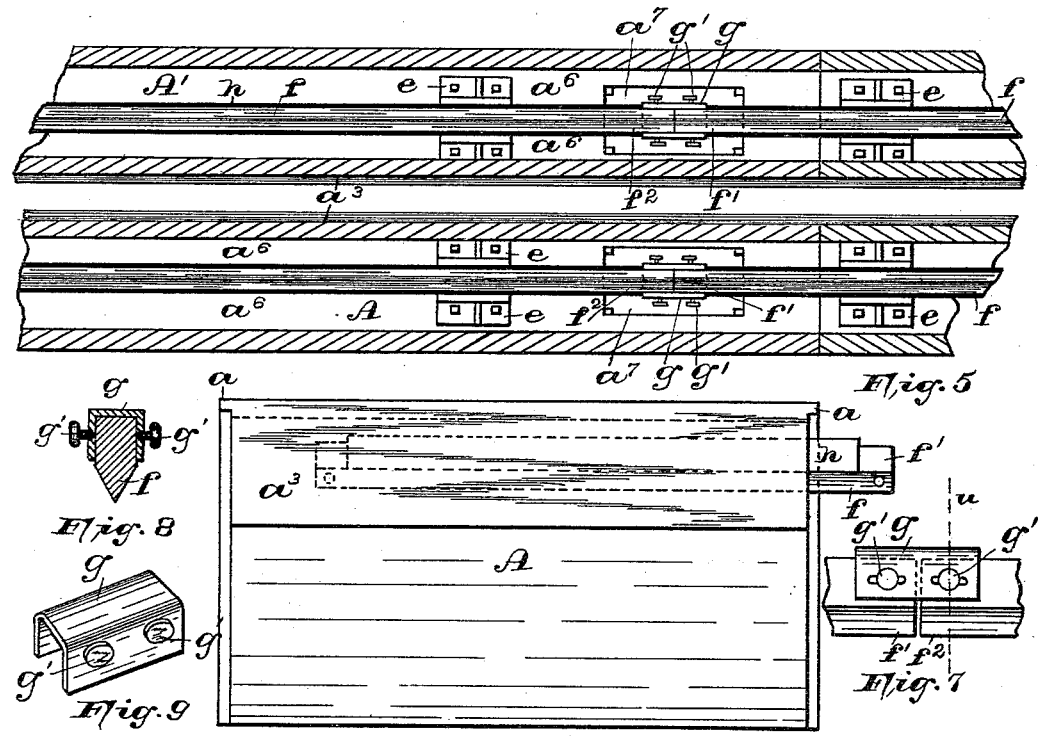

JOSEPH H. WEHRLE, OF NEWARK, NEW JERSEY.

CONDUIT AND ELECTRIC CONDUCTING-RAIL THEREFOR.

SPECIFICATION forming part of Letters Patent No. 437,953, dated October 7, 1890.

Application filed January 27, 1890. Serial No. 338,236. (No model.)

*To all whom it may concern:*

Be it known that I, JOSEPH H. WEHRLE, a citizen of the United States, residing at Newark, in the county of Essex and State of New Jersey, have invented certain new and useful Improvements in Conduits and Electric Conducting-Rails Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to an improvement in the construction of conduits provided with an open and continuous slot in the top thereof and continuous chambers or compartments therein, provided with continuous electrical conducting-rails in said chambers or compartments, upon which a contact-making carriage or trolley attached to a car is adapted to run.

The invention has for its object to provide a conduit made up of half-sections or plates arranged in opposite pairs on a bed-plate of cement or other material, the ends of the adjoining pairs of conduit sections or plates abutting and forming a conduit having a continuous and open slot in the top thereof, and conducting-rails secured and arranged in each of said sections in such a manner that the ends of the rails fit upon and slide over each other and connect and thereby form a continuous rail on each side of the slot within the conduit. Any one of said half-sections or plates may be separately removed from the conduit, and with each conduit section or plate that part of the rail secured therein is removed, thereby avoiding the necessity of first removing the rail from the conduit.

A further object of the invention is to provide the connecting or abutting ends of the rails in the adjoining conduit-sections with contact-plates secured thereto by means of set-screws, which causes a complete circuit through the rails to be established when the ends of two rails do not entirely meet, at the same time allowing the contraction of the metal of which the rail is made, while that of which the conduit consists expands, and vice versa.

In the two sheets of drawings accompanying this specification, Figure 1 is a plan view of the conduit provided with the continuous conducting-rails arranged between the tracks in the road-bed upon which the cars are run. The conduit is represented as provided with openings therein above the points where two sections of the conducting-rails meet, the covers over said openings being removed to illustrate the arrangement of the contact-plates connecting the conducting-rails. Fig. 2 represents an enlarged vertical section taken through line $x$ in Fig. 1, illustrating more clearly the manner of securing the conducting-rails within the conduit, and also showing the contact-plates in position on the overlapping rail-sections. Fig. 3 is a similar view with one of the sections comprising the conduit and its rail-section secured therein removed from its position in the bed-plate and illustrating one way of connecting the ends of the next two rail-sections by means of a wire, so as not to break the circuit and thereby prevent the travel of the cars. Fig. 4 is a cross-section of two of the oppositely-arranged half-sections or plates and the rails, illustrating the manner of securing said sections within the bed-plate by means of iron braces and tie-bolts. Fig. 5 is a horizontal section taken through line $y$, Fig. 4, looking in the direction of arrow $y'$; and Fig. 6 represents a side elevation of the inner side of one of the conduit-sections, looking in the direction of arrow $z$, Fig. 4, the position of a rail-section being shown in said figure. Fig. 7 is an enlarged view of the abutting ends of two rail-sections with a contact-plate arranged over the ends and secured thereto by means of contact-screws. Fig. 8 is a section through line $u$ in Fig. 7, and Fig. 9 a perspective view of the contact-plate. Fig. 10 is a longitudinal section of the conduit, showing the relative positions of the ends of two sections of conducting-rails therein when the iron conduit-sections have expanded, while the rail-sections have contracted, owing to the difference of the metals and their peculiar qualities. Fig. 11 is a horizontal section through line x in Fig. 10.

As illustrated in the accompanying drawings, the conduit, which is arranged between the rails in the street or ground, is made up of any number of half-sections or plates A and A' oppositely arranged in a cement or concrete bed B, which may be of any other suitable material, thus forming two continuous rows of such abutting half-sections, and thereby resulting in the conduit having a continuous and open slot in its upper side and continuous chambers on each side of said slot. In the present form of construction I prefer to use that claimed and illustrated in my application filed September 28, 1889, Serial No. 325,437. In said construction the half-sections A and A' are arranged in grooves $b$ and $b'$ running parallel the entire length of the bed B, and across said bed at desirable intervals are arranged the braces $c$ $c$, provided with grooves $c'$, into which the lower ends of the half-sections A and A' are secured and firmly held in place by means of the tie-bolts $d$ and $d'$, as is clearly illustrated in Fig. 4.

As will be seen from Fig. 3, one of the abutting side plates or half-sections is provided at its ends on the upper side, and also down the side of said section, with projecting or overlapping portions $a$, while the adjoining sections are provided with cut-away portions $a'$, on which said overlapping portions $a$ fit when the sections are in position in the bed-plate B. This arrangement avoids an opening between two adjacent sections and prevents the water or dirt from getting into the conduit, and at the same time enables the removal of any two adjoining conduit sections or plates A and A' in case of a break in the line.

From Fig. 4 it will be seen that each section is provided on its upper side $a^2$ with a downwardly-projecting flange or wall $a^3$. When the sections A and A' have been arranged in the grooves $b$ and $b'$ in the bed-plate B, said downwardly-projecting flanges $a^3$ form a continuous open slot in the top of the conduit and continuous chambers or compartments $a^4$ and $a^5$ within the conduit on both sides of the slot therein. In said compartments or chambers are arranged the rails for conducting the electric current, and on the lower side of said rails I purpose running my contact-making carriage, preferably that illustrated in my application filed October 9, 1889, Serial No. 326,486.

As will be noticed from Figs. 2, 3, and 5, each half-section is provided in the top thereof, in the chambers or compartments therein formed by the flange or wall $a^3$, with holding devices $e$, secured on the under side $a^6$ of the section in any convenient manner. Said holding devices $e$ are slotted in the bottom, and between the slots are arranged the rail-sections $f$. As is clearly shown in said figures, the rail-section $f$ is arranged in said holding-plates $e$ in such a manner that one end $f'$ of the rail projects beyond the end of the chamber in the conduit-section, while the other end $f^2$ of the rail is entirely within said chamber. When the sections A and A' have been placed in position on the bed-plate B, the projecting ends $f'$ of the rail-sections $f$ in each conduit-section project into the chamber of the adjoining section and make contact with the end $f^2$ of the rail therein.

The top of the conduit on both sides of the slot and above the chambers $a^4$ and $a^5$ is provided with openings $a^7$, arranged directly above the abutting ends $f'$ and $f^2$ of two of the adjoining rail-sections, through which a connecting or contact plate or joint $g$ may be inserted into the chamber or compartment which is placed on the top of and slides upon the sides of the two ends of the rail-sections, and is secured thereto by means of the contact-screws $g'$, which screw up against the rails and thereby complete the circuit, as is shown in Fig. 8, or the contact-plates may be arranged, as in Figs. 10 and 11, to allow for the expansion of the rail-sections when the conduit-section contracts. As will be noticed, the ends of the rail-sections are cut away and lap over each other, as shown in Fig. 11, being provided with two oppositely-arranged slots $f^3$ and $f^4$. The connecting-plate $g$ is placed over the ends of the rail-sections and the screws or bolts $g'$ passed through the slots and screwed fast on the opposite side in the downwardly-projecting flange of the contact or connecting piece $g$, said piece thereby completing the electrical connection with the ends of the rail-sections by means of its ends $g^2$. This construction allows the rail-sections to expand or contract any desired distance, according to the length of the slots. Thus it will be seen that the rail-sections, which are of a metal which expands when the iron of the conduit contracts, will at all times be perfectly straight and cause the smooth running of the trolley thereon, and by the arrangement of the overlapping portions $a$ and $a'$ at the end of each conduit-section complete and continuous chambers are formed within the conduit through its entire length, having therein a perfectly-straight line of continuous conducting-rails, as will be evident. Said conducting-rails $f$ may be of any cross-section, either round, V-shaped, or otherwise, and I propose to cover all of the sides of the rails except the contact-making surface, which in the present case is the bottom of the rail, with a non-conducting material $h$, as illustrated in Fig. 4. The rails are thus entirely insulated, except at their bottom side, and I have therefore a conducting-rail arranged in a conduit in which all difficulty of keeping the rails perfectly dry and in which the danger of any leakage of the electrical current has been successfully overcome. At the ends of the rails they are left bare of the non-conducting material in order to allow the sliding over of said contact-plate g upon the ends of the rails mentioned in the above. If desirable, said plates may also be insulated on their outer sides, and the conduit-sections may also be lined with any non-conducting material, as a heavy coat of asphalt or with creosoted wood.

From Fig. 3 it will be seen that in case of a break or other trouble in the line any one of the conduit-sections may be removed without necessitating the removal of the entire conduit or a large part thereof. When such a break has occurred, the covers in the openings $a^7$ in the conduit-sections are removed and the contact-plates g unscrewed. When this has been done, the nuts on the tie rods or bolts d and d' are slackened and the bolts slipped from the outwardly-projecting arms or braces c, and the entire half-section and its rail secured therein is removed and another section and rail can readily be placed in position in the conduit. As shown in said Fig. 3, instead of replacing the conduit-section by a new one the ends $f'$ and $f^2$ within the adjoining sections can be connected by means of a wire i, and the current thereby completed through the remaining rail without causing any delay in the travel of the cars upon the rails above the conduit.

Having thus described my invention, what I claim is—

1. A conduit composed of abutting sections made up of oppositely-arranged half-sections provided with inwardly and downwardly projecting flanges or walls, which form compartments or chambers in the top of the conduit on both sides of the slot, and each of said half-sections provided with a rail-section in each chamber, for the purposes set forth.

2. A conduit composed of abutting sections made up of oppositely-arranged half-sections provided with compartments or chambers, said sections being arranged on a bed and forming a continuous open slot in said conduit, and each chamber in each section having a conducting-rail therein, for the purposes set forth.

3. A conduit consisting of a number of abutting and oppositely-arranged half-sections or plates, bent as set forth, having downwardly-projecting walls or flanges, chambers or compartments formed by said walls, conducting-rails in the chambers in each section, the ends of said rails in each section being arranged to communicate with the ends of the rails in the next adjoining sections, and thereby forming a continuous rail on both sides within the conduit, for the purposes set forth.

4. A conduit consisting of a number of abutting and oppositely-arranged half-sections or plates, bent as set forth, having downwardly-projecting walls or flanges, chambers or compartments formed by said walls, openings in the top of said chambers, conducting-rails in the chambers in each section, the ends of said rails in each section being arranged to extend into and communicate with the ends of the rails in the next adjoining section, and a contact-plate connecting said abutting ends of the rails, whereby a positive electrical connection is established, for the purposes set forth.

5. In a conduit, the herein-described sectional plate A, bent as set forth, having a downwardly-projecting flange, which forms a chamber in the top of said sectional plate, fastening devices in said chamber, and a conducting-rail section suspended therefrom, for the purposes set forth.

6. In a conduit, the herein-described sectional plate A, bent as set forth, having a downwardly-projecting flange, which forms a chamber in the top of said sectional plate, openings in the upper side of said plate, fastening devices in said chamber, and a conducting-rail suspended therefrom, for the purposes set forth.

7. In a conduit, the herein-described sectional plate A, bent as set forth, having a downwardly-projecting flange, fastening devices in said chamber, and a conducting-rail secured therein by means of said devices, said rail being covered on all sides, except that side on which contact is made, with a non-conducting material, substantially as and for the purposes set forth.

8. A conduit composed of abutting sections, and each section being provided on its upper side with an inwardly and downwardly projecting flange or wall arranged along the entire length of each section, said walls or flanges in any two sections abutting and meeting end to end, and thereby forming continuous compartments or chambers without a break in the top, rails in the chambers in said sections, which meet and are connected by a contact-plate, whereby a direct and complete metallic circuit is established entirely within the continuous compartments or chambers in said conduit, for the purposes set forth.

9. A conduit composed of sections provided with overlapping ends, being provided with inwardly and downwardly projecting walls forming chambers, and also a continuous slot in the top of the conduit, a rail-section in each chamber, one end of which extends into the chamber in the next adjoining section, said end being constructed to lap over the end of the rail-section in said adjoining chamber, and a contact-plate secured over said connecting ends, for the purposes set forth.

10. A conduit composed of sections provided with overlapping ends, being provided with inwardly and downwardly projecting walls forming chambers, and also a continuous slot in the top of the conduit, a contact-rail in each chamber, one end of which extends into the chamber in the next section, said end being constructed to lap over the end of the rail-section in said adjoining chamber, oblong holes or perforations in the overlapping ends of said rail-sections, and a contact-plate over said ends provided with screws or bolts secured therein, which are loosely arranged in said oblong holes in the rail-sections to allow the free expansion and contraction of the rail-sections, as and for the purposes set forth.

In testimony that I claim the invention set forth above I have hereunto set my hand this 12th day of October, 1889.

JOSEPH H. WEHRLE.

Witnesses:
FREDK. C. FRAENTZEL,
WM. H. CANFIELD.